United States Patent [19]

Vio et al.

[11] Patent Number: 4,599,180

[45] Date of Patent: Jul. 8, 1986

[54] PROCESS OF THERMAL STABILIZATION OF AQUEOUS SOLUTIONS OF POLYSACCHARIDES AND ITS APPLICATION TO DRILLING FLUIDS

[75] Inventors: Lino Vio, Pau; Gilles Meunier, Lescar, both of France

[73] Assignee: Societe Nationale Elf Aquitaine, France

[21] Appl. No.: 655,862

[22] Filed: Sep. 28, 1984

[30] Foreign Application Priority Data

Sep. 28, 1983 [FR] France ................................ 83 15408

[51] Int. Cl.$^4$ ............................. C09K 3/00; E21B 0/00
[52] U.S. Cl. ............................. 252/8.55 D; 252/8.5 C; 536/114
[58] Field of Search ...................... 252/8.55 C, 8.55 D, 252/8.5 C; 536/114

[56] References Cited

U.S. PATENT DOCUMENTS

| | | | |
|---|---|---|---|
| 3,232,929 | 2/1966 | McNeely | 252/8.5 C |
| 4,048,079 | 9/1977 | Clampitt | 252/8.55 C X |
| 4,068,714 | 1/1978 | Hessert | 252/8.55 C X |
| 4,218,327 | 8/1980 | Wellington | 266/246 X |
| 4,247,402 | 1/1981 | Hartfiel | 252/8.5 A |
| 4,331,543 | 5/1982 | Wilson | 252/8.55 D |
| 4,353,805 | 10/1982 | Kragen | 252/8.55 D |
| 4,393,151 | 7/1983 | Dawans | 252/8.55 D |
| 4,508,629 | 4/1985 | Borchardt | 252/8.55 D |

FOREIGN PATENT DOCUMENTS 729150 3/1966 Canada ................... 252/8.55 D

*Primary Examiner*—John F. Terapane
*Assistant Examiner*—Susan Wolffe
*Attorney, Agent, or Firm*—Ostrolenk, Faber, Gerb & Soffen

[57] ABSTRACT

Stabilization of aqueous solutions of polysaccharides, even in the hot, by the addition of alkali metal dialkyldithiocarbamate and sodium chloride or calcium chloride. Applications to drilling fluids and to the improved recovery of crude oil.

9 Claims, No Drawings

PROCESS OF THERMAL STABILIZATION OF AQUEOUS SOLUTIONS OF POLYSACCHARIDES AND ITS APPLICATION TO DRILLING FLUIDS

The present invention relates to the stabilization to heat of water-soluble polymers based on polysaccharides. It applies more particularly to the stabilization of solutions based on synthesized saccharides, particularly xanthans and scleroglucans, which have an important use in drilling fluids and in the improved recovery of petroleum.

It is well-known in modern drilling technique to incorporate in the fluid in circulation substances which regulate its viscosity to a desired value. The substances most frequently employed at present are water-soluble polymers, particularly polyacrylamide, polysaccharides and carboxymethylcelluloses. Since temperatures elevated to a greater or lesser extent are encountered at deep drilling levels, the polymers in question undergo chemical modification in due course, which leads to a drop in their viscosity. The same disadvantage is found in the assisted recovery of petroleum. In a general manner, with known polymers per se, the viscosity of the muds and/or aqueous solutions drop rapidly when a temperature of about 65° C. is exceeded. To combat this problem, stabilizers have been found which allow the use of a given polymer for a longer time. Thus, in the case of polysaccharides, which are of interest both for drilling itself and for assisted recovery, anti-oxidants containing sulphur have been proposed as stabilizers, such as mercaptans, thioethers, thioureas or dithioacetic acids, associated with readily-oxidizable alcohols, as described in U.S. Pat. No. 4,218,327. It appears that such additives improve the stability of polysaccharides, even at temperatures of about 100° C., provided there is no more than 5% of salt in the liquid (the cited U.S. Patent, column 2, line 37).

The present invention provides a marked technical advance with respect to the prior art, in that it permits the use of polysaccharides at temperatures greater than 70° C. or in the range from 90°–130° C., for months, even in the presence of high concentrations of salts, particularly with more than 30% NaCl.

The activity in the presence of salts constitutes an unexpected feature of the invention. In fact, dithiocarbamates do not stabilize aqueous solutions of polysaccharides in the absence of salt, in contrast to what occurs with solutions of polyacrylamides. This is doubtless because no-one up to now has proposed the use of dithiocarbamates for stabilizing polysaccharides, although various other substances containing sulphur have been proposed. A stability test on a polysaccharide solution free from salts, containing sodium dimethyldithiocarbamate, in fact has the effect of completely discouraging the experimenter from using dithiocarbamate as a stabilizer.

In saline solution, good results are obtained, due to the use of a stabilizer constituted by an alkali metal dialkyldithiocarbamate dissolved in the polysaccharide solution.

Another advantage of the process according to the invention is that it is not necessary to employ an alcohol or other readily-oxidisable compound in conjunction with the stabilizer. It is even possible to dispense with deoxygenation of the fluid employed, if its oxygen content is not excessive.

The alkali metal dialkylthiocarbamates correspond to the formula

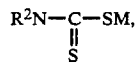

where R designates a $C_1$ to $C_{12}$ alkyl group, preferably from $C_1$ to $C_4$, M being an alkali metal atom, principally Na or K.

The proportion of this stabilizer to be used in a given fluid depends on the nature of the dithiocarbamate, the particular nature of the polysaccharide, the salinity of the liquid and the temperature, but the usual amounts are in the range from 150 to 5000 ppm and most frequently from 300 to 1000 ppm. It is to be noted that the lowest amounts are suitable when the solution contains NaCl alone or accompanied with very slight amounts of bivalent cations, particularly $CaCl_2$; in contrast, the proportion of stabilizer should be increased in proportion to any increase in the $CaCl_2$ content in the liquid.

The non-limitative examples which follow illustrate the invention. In the first 32 Examples, the stability of an aqueous solution of 2 g/l of polysaccharide, known commercially under the mark Rhodopol 23R (lot 80-209-2 supplied by the Rhone-Poulenc company), was determined by heating in sealed tubes at 90° C. Before heating, the solution was degasified so as to contain not more than 0.5 ppm of oxygen.

The criterion of alteration of the polysaccharide is its viscosity, determined at 25° C. before and after various periods of heating, by means of a "Rheomat 30" apparatus, in an $MS_O$ vessel at 10 sec$^{-1}$. Expressed in centipoises, this viscosity is indicated in the results tables which follow. The stabilizer tested is sodium dimethyldithiocarbamate or DMDTCS for short, which is dissolved in various quantities in the solution being tested.

In most of the tests, the solution contains salts, NaCl and/or $CaCl_2$, the role of which is explained. Variations in pH which accompany the alteration of the solutions are noted in each case.

EXAMPLES 1 TO 8

Polysaccharide solutions with 300 g NaCl per liter.

| Ex. No. | DMDTCS ppm | INITIAL Visc. cps | pH | AFTER 1 MONTH at 90° C. cps | pH | AFTER 3 MONTHS at 90° C. cps | pH |
|---|---|---|---|---|---|---|---|
| 1 | 0 | 140 | — | 3 | 3.4 | 3 | 3.4 |
| 2 | 50 | 141 | — | 4.5 | 3.8 | 4.5 | 3.8 |
| 3 | 150 | 141 | — | 24 | 4.4 | 21 | 4.5 |
| 4 | 250 | 142 | 6.6 | 141.5 | 6.8 | 126 | 5.9 |
| 5 | 350 | 145.9 | 6.2 | 145.9 | 7.4 | 143 | 6.3 |
| 6 | 400 | 138.5 | 6.3 | 137 | 6.4 | 140 | 6.4 |
| 7 | 450 | 144 | — | 143 | 6.6 | 137 | 5.7 |
| 8 | 600 | 144.5 | — | 147.5 | 6.8 | 139 | 6.2 |

It can be seen that, without the additive DMDTCS or with not more than 50 ppm of it, the degradation of the polysaccharide is very marked at 90° C.: already after 30 days, its viscosity falls from 140 cps to 3 or 4.5. In contrast, 250 ppm of the stabilizer according to the invention is sufficient for there to be only a slight fall and stabilization is in practice very good with 350 to 600 ppm.

EXAMPLES 9 TO 15

The solution of the polysaccharide contains 20 g/l of CaCl$_2$ as well as 300 g/l of NaCl as in the foregoing Examples.

| EX. No. | DMDTCS ppm | INITIAL cps | INITIAL pH | AFTER 1 MONTH at 90° C. cps | AFTER 1 MONTH at 90° C. pH | AFTER 3 MONTHS at 90° C. cps | AFTER 3 MONTHS at 90° C. pH |
|---|---|---|---|---|---|---|---|
| 9  | 0   | 145 | —   | 3     | 3.5 | 3   | 3.5 |
| 10 | 150 | 145 | —   | 5     | 4.2 | 3   | 4.2 |
| 11 | 250 | 145 | 6.2 | —     | —   | 113 | 5.4 |
| 12 | 350 | 145 | 7   | 4.5   | 5   | 137 | 6.2 |
| 13 | 400 | 146 | 7   | 126   | 6.4 | 137 | 6.1 |
| 14 | 450 | 143 | —   | 147.5 | 6.4 | 142 | 6.0 |
| 15 | 600 | 143 | —   | 156.5 | 6.7 | 153 | 6.4 |

These results show that the presence of CaCl$_2$ requires a slightly greater proportion of dithiocarbamate, in particular 450 ppm according to Example 14, instead of 350 in Example 5. Thus excellent stabilization is given when the solution contains NaCl and CaCl$_2$.

EXAMPLES 16 TO 21

Solution with a lower content of NaCl. It contains 150 g NaCl/l and 20 g CaCl$_2$/l.

| EX. No. | DMDTCS ppm | INITIAL cps | INITIAL pH | AFTER 1 MONTH AT 90° C. cps | AFTER 1 MONTH AT 90° C. pH | AFTER 3 MONTHS AT 90° C. cps | AFTER 3 MONTHS AT 90° C. pH |
|---|---|---|---|---|---|---|---|
| 16 | 0   | 132.5 | —   | 4.5  | 3.6  | 4.5   | 3.6  |
| 17 | 150 | 132.5 | 7.5 | —    | —    | 13.5  | 4.7  |
| 18 | 250 | 132.5 | 7.5 | 3    | 5.1  | 120.5 | 6.4  |
| 19 | 350 | 132.5 | 7.4 | 77.5 | 6.2  | 103.5 | 5.9  |
| 20 | 400 | 132.5 | 7.4 | 98   | 6.5  | 122   | 6.3  |
| 21 | 600 | 132.5 | —   | 140  | 6.54 | 139   | 6.4  |

These tests confirm the feature of the invention, according to which the salt contributes to the stabilizing action of the alkali metal dithiocarbamate. In fact, with half the foregoing concentration of NaCl, less good results are given for contents lower than 400 ppm and particularly 600 ppm of stabilizer. Nevertheless, the results of Examples 18 to 21 are industrially very interesting, but with double the NaCl (300 g/l), as in Examples 12 to 14, the stabilization is still better even for the same CaCl$_2$ content.

EXAMPLES 22 TO 27

Solution only containing CaCl$_2$: 20 g/l

| EX. No. | DMDTCS ppm | INITIAL cps | INITIAL pH | AFTER 1 MONTH at 90° C. cps | AFTER 1 MONTH at 90° C. pH | AFTER 3 MONTHS at 90° C. cps | AFTER 3 MONTHS at 90° C. pH |
|---|---|---|---|---|---|---|---|
| 22 | 0   | 117.5 | —   | 3     | 4   | 3    | 4   |
| 23 | 150 | 120   | —   | 44.5  | 4.7 | 6    | 4.5 |
| 24 | 250 | 122   | 6.5 | 62.5  | 6.1 | 50.5 | 5.8 |
| 25 | 350 | 123   | 6.8 | 102.5 | 6.7 | 97   | 6.2 |
| 26 | 450 | 125   | —   | 104   | 5.9 | 105  | 6   |
| 27 | 600 | 126.5 | —   | 122   | 6.5 | 117  | 6.3 |

The optimum stabilizing effect is thus found at about 600 ppm of dithiocarbamate, according to Example 27. This is a very good practical result, the amount of 600 ppm being entirely viable industrially.

EXAMPLES 28 TO 32

Solution of polysaccharide in distilled water without any salt.

| Ex. No. | DMDTCS ppm | INITIAL cps | INITIAL pH | AFTER 1 MONTH at 90° C. cps | AFTER 1 MONTH at 90° C. pH | AFTER 3 MONTHS at 90° C. cps | AFTER 3 MONTHS at 90° C. pH |
|---|---|---|---|---|---|---|---|
| 28 | 0    | 119 | —   | 3    | 4.2 |      |     |
| 29 | 150  | 122 | —   | 3    | 5   |      |     |
| 30 | 600  | 125 | —   | 4.5  | 6.9 |      |     |
| 31 | 1000 | 128 | 7.9 | 28.5 | 8.6 | 6    | 7.1 |
| 32 | 2000 | 129 | 8   | 36   | 8.3 | 10.5 | 7.6 |

It can be seen that, in the absence of salt, it is not possible to stabilize the polymer even with 2,000 ppm of DMDTCS, in contrast to the results obtained with saline water. Observation of the solutions indicates that the polysaccharide is present in the saline water in the form of rigid needles, while it has a disordered form in hot plain water; the sites of attack of the polymer are thus less accessible in the first case than in the second.

In contrast to the foregoing Examples, similar tests have been carried out with non-deoxygenated water.

EXAMPLES 33 AND 34

Aqueous solution of 2 g/l of polysaccharide containing per liter 300 g NaCl and 20 g CaCl$_2$, non-deoxygentated.

| Ex. No. | DMDTCS ppm | INITIAL cps | INITIAL pH | AFTER 30 DAYS at 90° C. cps | AFTER 30 DAYS at 90° C. pH | AFTER 90 DAYS at 90° C. cps | AFTER 90 DAYS at 90° C. pH |
|---|---|---|---|---|---|---|---|
| 33 | 600  | 145 | 7.1 | 101 | 7 | 12    | 6.4 |
| 34 | 1000 | 145 | 7.1 | 143 | 7 | 141.5 | 6.8 |

The dimethyldithiocarbamate, at the same time, thus serves as the antioxidant and also permits stabilization of the polysaccharide in the presence of oxygen. The minimum quantity necessary, around 1,000 ppm, that is somewhat higher than that which is sufficient in the case of the deoxygenated solution, is still completely viable in practice.

EXAMPLE 35

According to the technique of Examples 1 to 27, the behaviour has been tested of another polysaccharide, scleroglucane, the polymer obtained by the fermentation of sugars with the aid of a fungus. An aqueous solution of 0.5 g/l of the product known commercially under the name "Actigum CS 11" of the CECA company has been used. The solution contains, per liter: 0.5 g KCl 22 g NaCl 1.8 g CaCl$_2$.2H$_2$O and 0.6 g MgCl$_2$.6H$_2$O.

The temperature used for heating is 95° C. The same sodium dimethyldithiocarbamate, DMDTCS, as in the foregoing examples is employed, in an amount of 1 g/liter, in parallel with a control solution free from the stabilizer. The viscosities evolved in the following manner:

|  | Control Solution cps | Stabilized Solution cps |
| --- | --- | --- |
| Start | 14.4 | 14.2 |
| After 1 day at 95° C. | 8 | 13.9 |
| After 2 days at 95° C. | 4 | 13.8 |
| After 3 days at about 95° C. | 2 | 13.7 |
| After 30 days at about 95° C. | 1 | 13.2 |

With this different type of polysaccharide, the stabilization with DMDTCS is thus as good as in the foregoing examples. The necessary concentration of stabilizer, 1000 ppm (1 g/l), is entirely acceptable.

In the foregoing Examples, the salts contained in the polymer solution to be stabilized are alkali metal and alkaline earth metal chlorides. However, the invention can be carried out with other water-soluble salts, for example, sulphates, sulphites, perchlorates, acetates, alkali metal and alkaline earth metal tartrates, phosphates or borates in the absence of $Ca^{++}$ ions, etc. The Examples given above show that it is of advantage to have a high concentration of salt soluble in the polysaccharide solution to be stabilized. In general, a concentration of 0.1N of one or more salts can suffice, but it is preferable to exceed 0.4N. In contrast to the prior art cited above, concentrations higher than 1N, viz:—in the case of NaCl—from about 58 g/l are best; Examples 1 to 15 indicate particularly that it is advantageous to have 300 g of this salt per liter, that is 5.13N. Thus, the process according to the invention comprises the use of aqueous solutions of polysaccharides containing 200 to 5000 ppm thereof and one or more salts of an alkali metal and/or alkaline earth metal in a concentration from 0.1 to 10N and preferably from 0.4 to 6N.

We claim:

1. A method of heat stabilizing an aqueous solution of xanthan or scleroglucan which consists essentially of dissolving 150 to 5,000 parts per million of an alkali metal dialkyl dithiocarbamate, the alkyls of which each contain 1 to 12 carbon atoms, in said solution and maintaining an amount of sodium chloride in said solution at a concentration of 0.4 to 6N.

2. The method of claim 1 wherein said alkyl group each contains 1 to 4 carbon atoms.

3. The method of claim 1 wherein said solution contains xanthan or scleroglucan in an amount of 200 to 5,000 ppm.

4. The method according to claim 3 wherein the amount of alkali metal dialkyl dithiocarbamate is 300–1,000 ppm and the sodium chloride concentration is 0.85–6N.

5. The method according to claim 1 wherein said aqueous solution contains 0 to 20 grams per liter of calcium chloride.

6. A method according to claim 1 in which said alkali metal dialkyl dithiocarbamate is sodium diethyl dithiocarbamate.

7. A method of heat stabilizing an aqueous solution of xanthan or scleroglucan which consists essentially of dissolving 250 to 1,000 parts per million of an alkali metal dialkyl dithiocarbamate, the alkyl groups of which each contain 1 to 4 carbon atoms, in said solution and maintaining the concentration of sodium chloride and calcium chloride in said solution at 58–300 grams per liter and 0–20 grams per liter, respectively.

8. The method of claim 7 in which the aqueous solution contains 200–5,000 parts per million of xanthan or scleroglucan.

9. The method of claim 8 wherein said dithiocarbamate is sodium diethyl dithiocarbamate.

* * * * *